US008416056B2

(12) United States Patent
Miller et al.

(10) Patent No.: US 8,416,056 B2
(45) Date of Patent: Apr. 9, 2013

(54) ENTRANCE BARRIER

(75) Inventors: Norbert Miller, Mönchengladbach (DE); Peter Höffges, Mönchengladbach (DE)

(73) Assignee: Scheidt & Bachmann GmbH (DE)

( * ) Notice: Subject to any disclaimer, the term of this patent is extended or adjusted under 35 U.S.C. 154(b) by 563 days.

(21) Appl. No.: 12/613,856

(22) Filed: Nov. 6, 2009

(65) Prior Publication Data

US 2010/0117785 A1 May 13, 2010

(30) Foreign Application Priority Data

Nov. 7, 2008 (EP) .................................... 08019499

(51) Int. Cl.
*B60R 25/00* (2006.01)

(52) U.S. Cl. ........ 340/5.73; 340/3.1; 318/280; 318/285; 73/774; 73/780; 49/26; 49/28

(58) Field of Classification Search .................. 340/3.1, 340/5.2, 5.7–5.73; 318/280–286; 73/780; 49/27–44, 26
See application file for complete search history.

(56) References Cited

U.S. PATENT DOCUMENTS

| | | | | |
|---|---|---|---|---|
| 5,027,552 | A | 7/1991 | Miller et al. | |
| 7,132,642 | B2 * | 11/2006 | Shank et al. | 250/221 |
| 7,162,928 | B2 * | 1/2007 | Shank et al. | 73/780 |
| 7,293,467 | B2 * | 11/2007 | Shank et al. | 73/780 |
| 7,312,591 | B2 * | 12/2007 | Washeleski et al. | 318/280 |
| 7,342,373 | B2 * | 3/2008 | Newman et al. | 318/466 |
| 7,449,852 | B2 * | 11/2008 | Washeleski et al. | 318/280 |
| 7,513,166 | B2 * | 4/2009 | Shank et al. | 73/780 |
| 7,518,327 | B2 * | 4/2009 | Newman et al. | 318/286 |
| 2005/0016290 | A1 | 1/2005 | Shank et al. | |
| 2009/0146668 | A1 | 6/2009 | Wuerstlein | |

FOREIGN PATENT DOCUMENTS

| | | |
|---|---|---|
| DE | 20 2006 010 813 | 7/2006 |
| EP | 1 154 110 | 11/2001 |
| EP | 1 235 190 | 8/2002 |
| WO | 2004-038149 | 5/2004 |

* cited by examiner

*Primary Examiner* — Albert Wong
*Assistant Examiner* — Peter Mehravar
(74) *Attorney, Agent, or Firm* — Harness, Dickey & Pierce, P.L.C.

(57) ABSTRACT

The present invention relates to an entrance barrier comprising a barrier element movable between an open and a closed position, driving means, by which the barrier element can driven from one position to the other position respectively, a control unit, by which the driving means are controllable, and a sensor unit connected to the control unit. The invention also relates to a barrier element for the entrance barrier and to method for operating the entrance barrier. To provide a possibility of further improving the safety of persons in the area of entrance barriers beyond the mere passive safety of the entrance barrier, the invention proposes for the sensor unit to include a capacitive sensor.

20 Claims, 2 Drawing Sheets

ENTRANCE BARRIER

CROSS REFERENCE TO RELATED APPLICATIONS

This application claims foreign priority to European Patent Application No. 08019499.6 filed Nov. 7, 2008 which is hereby incorporated by reference.

BACKGROUND OF THE INVENTION

1. Technical Field

The present invention relates to an entrance barrier comprising a barrier element movable between an open and a closed position, driving means, by which the barrier element can be driven from one position to the other respectively, a control unit, by which the driving means are controllable, and a sensor unit connected to the control unit. The invention also relates to a barrier element for the entrance barrier and to a method for operating the entrance barrier.

2. Discussion

Entrance barriers of the above-described type are used in the prior art for a variety of applications, for instance for controlling the entrance or access to areas which are protected and/or subject to a charge. Entrance barriers are frequently used for instance in public transport, airports, especially in security checks, and also in public buildings such as swimming pools or sports facilities. They serve among others to grant access only to authorized persons or to grant only single access of persons.

In a security check for instance, an entrance barrier is provided in the form of two mutually opposite door wings which are driven for swiveling and which are automatically swung to an open position when an authorized person desires access and wants to pass the entrance barrier. To this end, the person inserts an access authorization card in a checking station capable of verifying authorization, and if the authorization is valid, the control unit connected to the checking station controls the driving means to move the door wings of the swing doors to the open position, whereupon the individual is allowed to pass the open entrance barrier. After passing the entrance barrier, the door wings are automatically closed again. Passage of the entrance barrier is detected by the sensor unit, and a corresponding signal is transmitted to the control unit. After passage of the entrance barrier, the barrier element is moved to the closed position. A light barrier is used as a sensor unit, which substantially enables a selective detection of a current position of a person. But this detection is insufficient, because the substantially linear detection area of the light barrier is very small. It is not possible to detect a person outside of the detection area. An additional drawback is that the light barrier delivers false detection values caused by the influence of ambient light. This may cause faulty control by the control unit.

To avoid that a person is hurt by the movement of the door wings, the energy transmittable from the driving means to the door wings is limited. If a person is still present in the movement range of a door wing during the opening or closing movement of this door wing, because the person has changed his/her direction of movement or stopped moving, the door wing will hit the person and stop its movement due to the limited energy, so that the person is hurt as little as possible. Accordingly, the entrance barrier provides passive safety. On the other hand, the mere contact between the person and the door wing may cause painful collisions, if not even injuries, especially if the person carries pieces of luggage. Moreover, this concept of passive safety puts limitations to the design of the door wings, particularly with regard to the weight, size and speed of movements. It is precisely this area where a light barrier cannot be installed, because the light barrier would interfere with the intended function of the door wing.

SUMMARY OF THE INVENTION

The invention is therefore based on the object of providing a possibility to further improve the safety of individuals in the area of entrance barriers beyond the mere passive safety of the entrance barrier.

As a solution of this object the invention proposes that the sensor unit includes a capacitive sensor. With the capacitive sensor it is possible to detect the presence of individuals especially in the movement range of the barrier element. The barrier element may be provided for example in the form of a swing door or also a pair of swing doors or a sliding door, a turnstile, a barrier, combinations thereof or the like. The barrier element can have a one-piece or a multi-piece design and thus comprise for example a single-wing or multi-wing swing door. The capacitive sensor is preferably so designed that it produces an electric field which extends to an adjacent space and particularly to the space adjacent to the entrance barrier, and so that it detects changes.

Normally, the effects of this type of sensor are as follows:

1. Insulators in the plate capacitor
   - By introducing a dielectric (insulator) into a charged capacitor, the electric field is weakened due to the polarization. The plate voltage drops, because no charge can flow to the capacitor. The capacitance of the capacitor increases.
2. Electrically conducting ungrounded materials in the plate capacitor
   - By introducing an electrically conducting object into a charged capacitor, the field is weakened due to the influence effect. The field lines are shortened due to the inserted conductor. Graphically imagined, the result is a reduction of the plate spacing. The capacitance of the capacitor increases.
3. Electrically conducting grounded object in the plate capacitor (Shadowing mode)
   - If a grounded electrically conducting body (human/animal) is present in the plate capacitor, the measurable capacitance becomes smaller. A part of the influenced charge carriers is discharged through the "electrode of the body". A precondition for this measuring principle is a ground reference of the supply voltage.
   - In the specific embodiment herein described, method 3 is applied, though the remaining two methods can also be applied, provided that for example a galvanically floating measuring voltage is available.

It is known that the electric field is changed by a dielectrically permeable body, but also by a conducting body which includes among others also a human being, an animal or any other living thing. If the body is a dielectrically permeable body, the field is weakened and thus the capacitance of the sensor increases. Grounded electrically conducting bodies, for example a human being or an animal, cause the capacitance to decrease. The change of capacitance can be detected by an appropriate evaluation circuit and can be provided in the form of suitable signals for additional purposes. Preferably, the sensor covers a region of a space comprising at least the movement range of the barrier element. The sensor can be arranged in a stationary fashion for example on the entrance barrier. Its dimensions are preferably adapted to the barrier element and/or to the dielectrically permeable body to be detected, so that a reliable detection of the body can be guaranteed. The detection of the capacitance of the sensor can take place for example by means of charge or discharge pulses, frequency changes and/or the like. So it is possible for example to adjust a measuring frequency, rate of change of a measuring pulse or the like according to the needs. Preferably, the capacitive sensor is installed remotely from additional dielectrically permeable or electrically conducting components, so that any interference with such components can be avoided as far as possible. Additionally, compensation circuits and/or functions can be provided, to be able to neglect or compensate disturbing dielectrically permeable or electrically conducting components with regard to the evaluation of the sensor. The sensor can have a segmented structure for example, so that it is capable of sensing differently large bodies with different accuracy. Such additional information which is obtained can be used also for control purposes, by activating for example the barrier element only if particular individual sensors of the segmented sensor have been activated. Of course, the operation signal for the sensor can be adapted to dielectrically permeable or electrically conducting bodies to be detected, in order to improve the detection. The capacitive sensor is connected to the sensor unit that evaluates the signals from the sensor and transmits on its part a corresponding signal to the control unit. The control unit evaluates this signal and initiates if necessary appropriate control of the driving means for the barrier element.

Preferably, the sensor is arranged on the barrier element. In this way it can be achieved that the sensor preferably covers the range in which the barrier element is movable. It is thus possible to use a sensor having a directional effect, so that the detection of a body can be further improved. Moreover, separate means for the arrangement of the sensor can be saved.

The sensor may have its own evaluation circuit that applies a corresponding operation signal to the sensor and evaluates a corresponding measuring signal from the sensor as a response signal. The evaluation circuit can be connected to the control unit. The evaluation signal is capable of transmitting a signal which corresponds to the detected measuring value to the control unit and/or to a remote center.

Preferably, the sensor is at least partly formed by an electrically conducting part. The electrically conducting part can be formed by an electrically conducting material such as metal, an electrolyte or the like. But an electrically conducting plastic material, an electrically conducting ceramic material or the like can also be provided in order to form the electrically conducting part. Moreover, a design in the form of a composite material is also conceivable, in which an electrically conducting layer is applied to an insulating material. The electrically conducting part can be connected to the evaluation circuit via one more lines. If the sensor is arranged on the barrier element, the conducting part can comprise the entire barrier element or also only parts thereof. Moreover, auxiliary electrodes can be provided, by which the electric field of the sensor can be influenced in a desired manner, in order to still further improve the detection of the body. It can be provided for instance that the sensor includes adjacent partial sensors to which differently high electric voltages of preferably the same polarity are applied. In this way it is possible for example to achieve a directional effect.

To reduce the influence of external ambient conditions on the sensor and to simultaneously avoid the risk of individuals being injured by electricity, the sensor is preferably electrically insulated. To this end, the conductive part can be coated for example with an insulating varnish or provided with an insulating coating, preferably from an insulating plastic material or the like. Parasitic currents into the sensor can be reduced.

Further, the sensor may include an open conductor loop and/or a conductor surface. The conductor loop or the conductor surface is made from an electrically conducting material, preferably from a material exhibiting good electrical conductivity such as copper, aluminum, brass or the like. The conductor surface or conductor loop is electrically connected to the evaluation circuit. The conductor loop can be formed as a spiral, especially an Archimedean spiral, on the barrier element. In the same manner as the conductor surface, the conductor loop can be circular, ellipsoid or also angular, e.g. rectangular, polygonal or the like. Preferably, the conductor loop or conductor surface lies in a geometrically plane surface, for example a surface of the barrier element, such as for example a door wing of a swing door or the like. The conductor surface may have a texture, in order to achieve a more favorable field effect. The conductor surface may include different surface sections electrically connected to each other. The detection of the body can be further improved.

According to a further embodiment, the entrance barrier can comprise at least two barrier elements, especially two barrier elements that are jointly movable. The barrier elements can be arranged oppositely to each other in the passage way of the entrance barrier and can comprise common or also separate driving means. The driving means can be formed for example by electric drive units such as electric motors or the like. But they can also be hydraulic and/or pneumatic. The common drive unit can also be implemented by a transmission capable of jointly driving the barrier elements. In the case of sliding doors, it can be provided for instance that for opening the passageway two mutually opposite sliding doors are operated by the drive unit(s) in such way that the sliding doors are removed from the passageway. In the case of swing doors, it can be provided that the swing doors are simultaneously swung to the open position. Of course, the barrier element can also be designed in a multi-part fashion, for instance by a swing door being simultaneously constructed as a folding door, thus allowing to reduce the space which is engaged by the barrier element. Thus it is possible to adapt the entrance barrier in a variety of ways to the respective requirements.

A barrier element for the entrance barrier is also described herein. The sensor for example can be formed as one piece with the barrier element, thus not only reducing the number of components, but also increasing reliability, since the sensor can be protected by the barrier element. To this end, the barrier element itself can comprise electrically conducting parts, conductor loops and/or conductor surfaces which are incorporated in the barrier element. The barrier element can have recesses which receive the sensor and which are subsequently closed by a suitable material. It is also possible for the sensor being formed by a layer on the barrier element which is applied for example by vapor deposition or any other technique capable of forming layers on a surface of the barrier element. Additionally, protective layers can be applied to protect both the sensor and the barrier element against external influences.

According to a further development, the barrier element can be constructed in a two-part or multi-part fashion. This enables a compact construction of the barrier element, especially in its closed position, so that all in all a very compact entrance barrier can be achieved. For this purpose, the barrier element can be segmented in the fashion of a folding door or the like.

A method for operating an entrance barrier is also disclosed, wherein a barrier element is moved between an open and a closed position by driving means. The driving means are controlled by a control unit detecting the presence of a body, especially of a dielectrically permeable and/or electrically conducting body in a space within the range of the barrier element by means of a capacitive sensor, and transmitting the output from the sensor to the control unit. Preferably, the sensor is capable of detecting a movement of the body.

Accordingly, the capacitive sensor detects whether a dielectric body, especially an individual, is present in the space near the barrier element, particularly in an area into which the barrier element is moved. The result is preferably transmitted to the control unit and can serve as a basis for the control of the driving means. A dielectrically permeable body is a body having a relative dielectric permeability greater than 1, particularly greater than 10, preferably greater than 15. The bodies which can be detected here can be dielectrically permeable bodies (insulators) or electrically conducting bodies. Accordingly, these bodies can also be living things, particularly animals and people. But such a detectable body can also be an object having a relative dielectric permeability greater than 1, for example plastic materials, ceramic materials, ferrites, combinations thereof and combinations with other materials and/or the like, but also electrically conducting bodies such as metal suitcases for example.

The capacitive sensor can be fixed relative to the barrier element, but it can also be arranged on the barrier element itself. Preferably, the capacitive sensor has a directional effect, so that the sensitivity can be increased in a desired area. Preferably, the sensitivity is increased in an area where the barrier element is moved between the two positions. For this purpose, the sensor itself can be made up from several individual partial sensors allowing a corresponding directional effect to be achieved. Moreover, by suitably designing the sensor, interference immunity with regard to electromagnetic tolerance can be improved. To this end, the sensor can be textured for example in the form of branching patterns or the like.

The method of the invention further provides that the driving means are deactivated by the control unit. Deactivation preferably takes place if a body is detected in the area of the barrier element which impedes the movement of the barrier element. By deactivating the driving means, the energy of a collision between the barrier element and the body can be reduced. In the case of moving bodies, it is also possible to achieve that a collision with the barrier element is associated with a lower energy absorption, since the barrier element is preferably freely movable during the collision, which means that the drive unit does not deliver additional energy during the collision. It is merely the energy of a differential pulse that has to be absorbed correspondingly by the body element and the barrier element. Thus damage to bodies, especially injury to an individual or an animal, can be clearly reduced.

According to a further development it is proposed that an access authorization is verified. The body can be provided with an authorization in the form of a bar code, a readable transponder or the like, with an authorization code being read and verified. If the authorization is approved, the driving means for moving the barrier element to the open position can be operated. If the authorization is not valid, the driving means is kept deactivated and the barrier element remains in its closed position. In the closed position, the barrier element is preferably locked, thus preventing unauthorized opening by external manipulation.

A further embodiment provides that the passage of a body is traced and/or recorded. Thus it is possible to retrace the passage of the body through the passage way of the entrance barrier. Accordingly, it can be provided that after the body has passed through the passage way, the barrier element is automatically moved to the closed position. Preferably, this movement shall take place only after the body has left the range of movement of the barrier element, in order to avoid a collision. For this purpose, the sensor can be evaluated continuously and/or in a time-discrete manner at correspondingly short intervals, in order to determine the position of the body in the entrance barrier. The values that have been determined with regard to the position of the body can be recorded for establishing for example a movement profile and/or for making a classification of the body. It can be achieved that for example several individuals inside the entrance barrier can be identified. Additionally, it is possible to detect and if necessary report unauthorized passage of several individuals, if the entrance barrier is designed for single passage.

Further, the position of the barrier element can be monitored by means of the sensor. The sensor can be constructed for example in a two-part fashion, one part of the sensor being attached to the barrier element and a second part being fixed in a different position on the entrance barrier. In the multi-part design of the entrance barrier, for example in the case of double-wing doors, the sensor can also be arranged on the door wings or on the several parts of the barrier element. Thus the position of the barrier element can be monitored, and the driving means can be controlled in a suitable manner. This embodiment further enables the detection even of intermediate positions between the open and closed positions. Accordingly, it can be provided for the barrier element to assume intermediate positions in a controlled manner. Preferably, the barrier element is also lockable in these intermediate positions, so that it cannot be moved by exerting external forces.

According to a further development it is proposed that several sensors are used, particularly sensors of adjacent entrance barriers, which are evaluated in a time multiplex mode. This makes it possible to decouple the sensors with regard to their interaction. This embodiment also enables the reduction of the evaluation circuit, since preferably only one evaluation circuit is provided which is coupled to the individual sensors on a time multiplex basis by means of a multiplexer.

A further advantageous embodiment provides that the sensor is synchronized automatically. By the synchronization of the sensor, disturbing influences, parasitic capacitances and the like can be considered, so that the sensor is capable of delivering a reliably evaluable signal substantially independently of possible changes of boundary conditions such as air humidity, temperature and/or the like. Preferably, the synchronization takes place automatically, so that any manual operations can be saved. For this purpose, corresponding measuring means can be provided for detecting changes of the boundary conditions which can be considered in the evaluation. It can also be provided that a corresponding operation signal for the sensor is adapted in dependence of the boundary conditions, in order to effect a corresponding synchronization.

BRIEF DESCRIPTION OF THE DRAWINGS

Further advantages and features will become apparent from the following description of an example. In the description similar parts are identified by the same reference numbers. Further, concerning features and functions which are similar, reference is made to the embodiment illustrated in FIG. 1. The drawings are schematic drawings and merely serve to explain the following embodiments in which.

DESCRIPTION OF THE PREFERRED EMBODIMENTS

Figure 1:
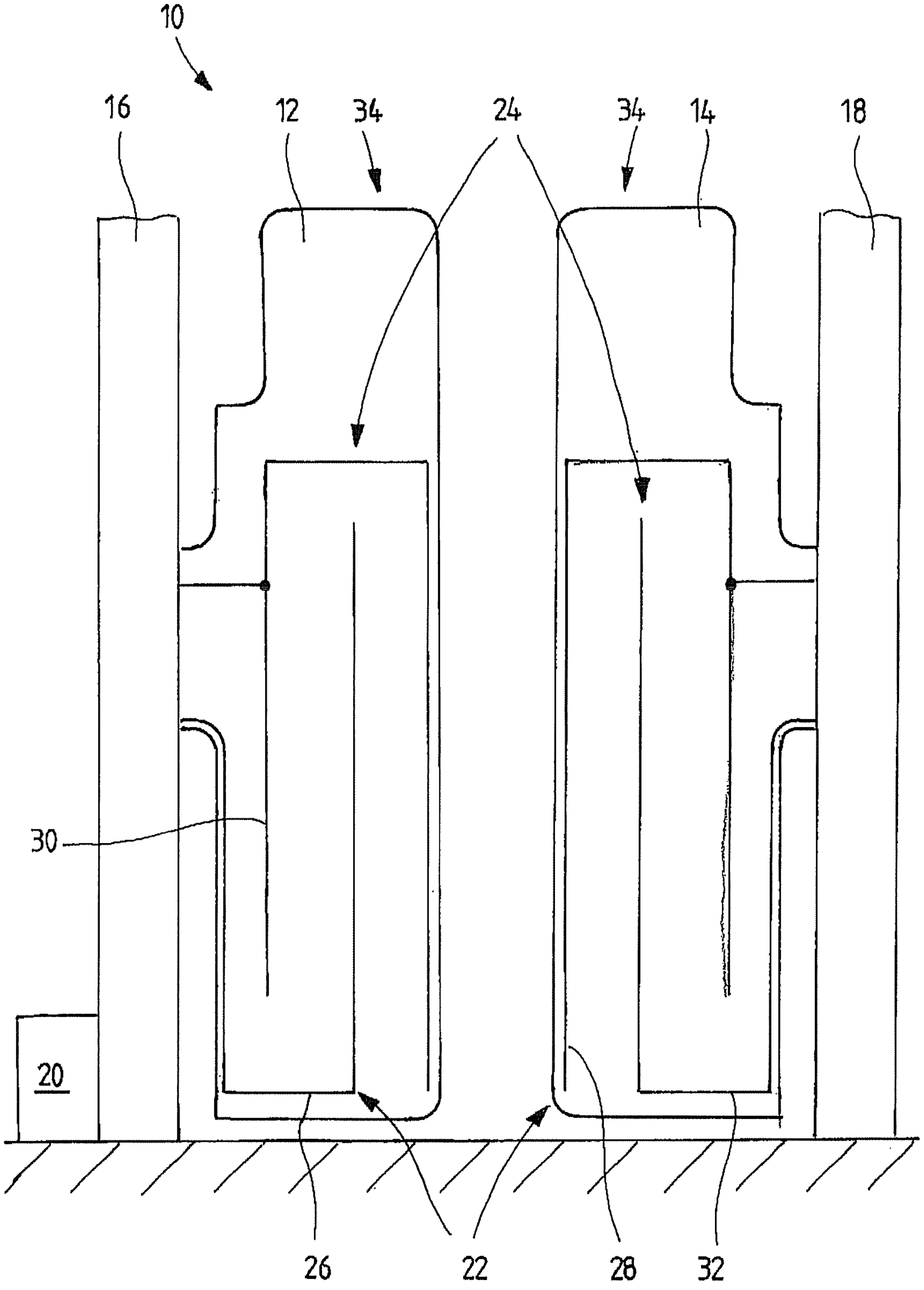
FIG. 1 illustrates an entrance barrier according to the invention comprising a barrier element having two mutually oppositely arranged swinging door wings with capacitive sensors.

FIG. 1 schematically illustrates a gate 10 as an entrance barrier typically used in security areas on airports. The gate 10 comprises two door wings 12, 14 as barrier elements which are movable between an open and a closed position and which are arranged in a ground passage area (not further illustrated) of gate 10. Grounding is generally not required for the invention. But the following embodiment is nevertheless based on the functional principle (shadowing mode) described at the beginning as the 3rd effect, for which reason grounding is provided in the present case.

FIG. 1 shows the closed position. The door wings 12, 14 can be driven by two drive units in the form of electric motors 16, 18 as driving means, wherein the door wings 12, 14 are capable of being driven from one position to the other position respectively. The drive unit 16 is capable of moving door wing 12, whereas the drive unit 18 is capable of moving door wing 14. The drive units 16, 18 can be controlled via a control unit 20.

The door wings 12, 14 include two capacitive sensors 22, 24, each of the sensors 22, 24 being formed by a pair of open conductor loops 26, 28, 30, 32. The open conductor loops 26, 28, 30, 32 are formed as one piece with the door wings 12, 14 by being applied as a conductive layer to the surface of the door wings 12, 14 using a suitable manufacturing technique. In the present case, the door wings 12, 14 are made of safety glass to which the open conductor loops 26, 28, 30, 32 are applied by evaporation. In the present case, the sensor 22 is formed by the open conductor loops 26, 28, and the sensor 24 is formed by the open conductor loops 30, 32. Accordingly, as shown in FIG. 1, each of the two sensors 22, 24 is arranged with one half on one of the door wings 12, 14. For contacting purposes, the open conductor loops 26, 28, 30, 32 are extended to the hinge area of the door wings 12, 14, where they are contacted by means of corresponding electrical lines (not further identified), in order to connect the open conductor loops 26, 28, 30, 32 to an evaluation circuit 36 as a sensor unit (FIG. 2).

Figure 2:
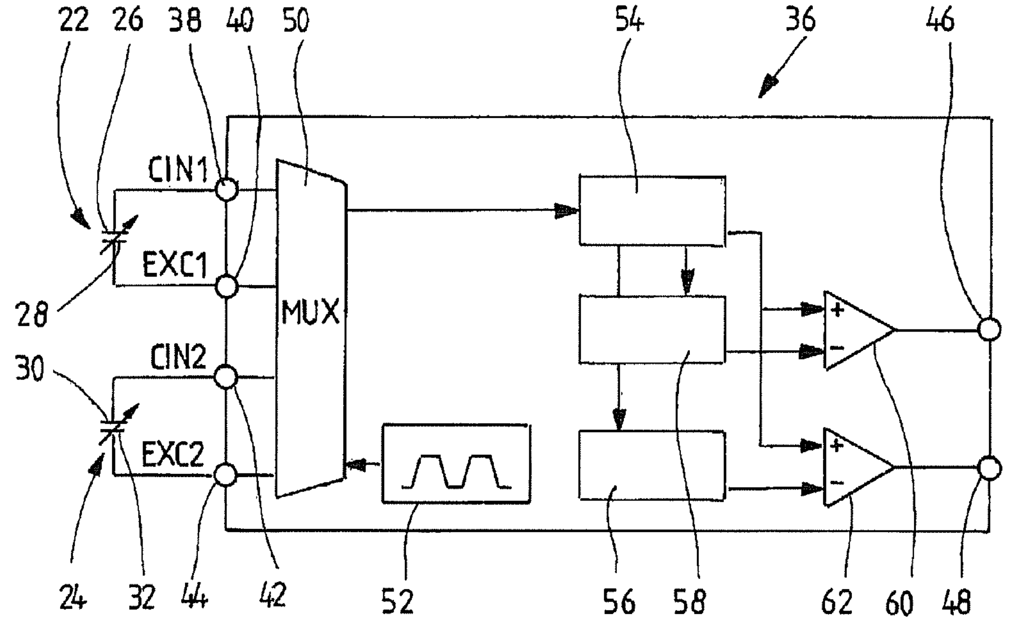
FIG. 2 is a basic circuit diagram of an evaluation circuit for the capacitive sensors according to FIG. 1.

FIG. 2 is a basic circuit diagram of the evaluation circuit 36 to which the sensors 22, 24 are connected by their open conductor loops 26, 28, 30, 32. For this purpose, the evaluation circuit 36 comprises connectors 38, 40, 42, 44 to which the open conductor loops 26, 28, 30, 32 are connected, as shown in FIG. 2. Internally in the evaluation circuit 36, the connectors 38, 40, 42, 44 are guided to a multiplexer 50 which reciprocally and alternately connects the sensors 22, 24 in a time division multiplex mode to the additional component groups necessary for the operation and evaluation of the sensors 22, 24.

Reference number 52 designates a generator which produces an alternating voltage signal having a predetermined slew rate. This signal is also fed to the multiplexer 50, through which the alternating voltage signal is alternately applied to the connector 40 or 44. The two connectors 38, 40 are connected alternately and in the same rhythm to a signal evaluation unit 54 by means of the multiplexer 50. The signal evaluation unit 54 evaluates and prepares the signals for further processing. The output signal from the signal evaluation unit 54 is applied to the positive input of two comparators 60, 62 comparing this signal with reference signals from the reference signal generators I and II 56, 58. The outputs of the comparators 60, 62 are applied to the connectors 46, 48 of the evaluation unit 36. To the connectors 46, 48 the control unit 20 is connected via connection lines which are not further identified.

Together with the multiplexer 50 also the reference signal generators I and II 56, 58 are clocked, so that only a respective one of the comparators I and II 60, 62, of which the associated sensor 22, 24 is being evaluated, delivers an output signal.

From the view of the evaluation circuit 36, the two open connector loops 26, 28 of the sensor 22 and the two open connector loops 30, 32 of the sensor 24 constitute variable capacitors, of which the capacitance shall be measured. Therefore, during operation, an electric field is generated between the two door wings 12, 14 which is substantially invariable in the stationary case and simulates for the evaluation circuit 36 a pre-determinable quiescence capacitance of the sensor 22, 24. Now, if a dielectrically permeable body moves in a space 34 in the range of the door wings 12, 14, the stationary electric field changes, thus causing a change of capacitance which can be detected by the evaluation circuit 36. As soon as a sufficient change of the capacitance is detected, the signal evaluation unit 54 produces a signal exceeding the respective reference signal from the reference signal generators I and II 56, 58, whereupon the corresponding active comparator I respectively II 60, 62 outputs a respective output signal to its corresponding connector 46, 48. This signal is transmitted for additional control purposes to the control unit 20 connected to the connectors 46, 48.

Also the opening or closing of the door wings 12, 14 is detected, because this also causes a change of the capacitance of the sensors 22, 24.

Accordingly, the invention allows the movement of a body, particularly the movement of an individual in the space 34 in the range of the door wings 12, 14 to be detected and transmitted to the control unit 20. The evaluation circuit 34 can be integrated in the control unit 20.

If a movement of a body in the space 34 is detected, the drive units 16, 18 are deactivated by the control unit 20. This enables the door wings 12, 14 being freely movable, so that an individual present in the swiveling area of the door wings 12, 14 is able to push the door wings 12, 14 away, without being hurt. An alternative provides that the drive units are abruptly braked and fixed.

In the present embodiment it is further provided that the drive units 16, 18 before being deactivated are transferred to a rest position, so that the door wings 12, 14 do not continue to move. The drive units 16, 18 are decoupled only after the rest position has been assumed. This avoids that the continued swiveling movement of one of the door wings 12, 14 may cause a collision with the body or with the individual. Accordingly, the doors remain in their current position of swiveling and can be moved manually. Moreover, it can be provided that the drive units remain in the braked (blocked) condition and are transferred to a defined end or central position, after the individual has left or the body has been removed from swiveling area.

It is not shown that the entrance barrier 10 includes a verification unit to which an authorization card is inserted by the individual which desires to pass. If the authorization is verified as valid, the door wings 12, 14 are moved to the open position by the control unit 20 and the drive units 16, 18. In the open position of the door wings 12, 14, passage of the individual which desires to pass is detected by the sensors 22, 24. As soon as the individual has passed the entrance barrier 10 and has left the space 34 in the range of the door wings 12, 14, the entrance barrier 10 is automatically closed by the control unit 20 and the drive units 16, 18, by moving the door wings 12, 14 to the closed position. Further, the passage of the individual is traced and recorded. This makes it possible to establish a personalized passage profile. Thus an authorization profile can be established, so that a personalized authorization can be verified using the passage profile. Any discrepancy can be informed to a central office or the like.

The sensors 22, 24 simultaneously allow monitoring the position of the door wings 12, 14 relative to each other. This makes it possible to monitor the opening or closing movements of the door wings 12, 14 substantially continuously or in a time-discrete manner. This construction also allows the door wings 12, 14 to be moved to pre-determinable intermediate positions.

To ensure that adjacent entrance barriers 10 influence each other as less as possible, it can be provided that the sensors 22, 24 of the adjacent entrance barriers 10 are operated and evaluated in a time multiplex mode, so that mutual influencing can be avoided. For this purpose, a higher-level control unit can be provided which correspondingly controls the control unit 20 and the evaluation unit 36. It can be provided for example that the activation changes in a 100 ms cycle. The evaluation circuit 36 is directly or indirectly connected electrically to earth.

The reference values of the reference signal generators I and II 56, 58 can be adjustable or programmable. Moreover, it can be provided that the reference signals are correspondingly adjustable by means of the control unit 20. The reference values can be adjusted for example in dependence of the respective position of the barrier elements 12, 14. But also the evaluation circuit 36 can itself include means for updating the reference signals, in order to be able to compensate boundary conditions like air humidity or the like. A particular advantage is that in the present embodiment the sensors 22, 24 are automatically synchronized. This automatic synchronization can take place for example through additional evaluations of the detected signals, especially of the signal from the signal evaluation unit 54. In this case, an additional differentiation can be made for example, which allows to detect fast changes compared to slow changes of temperature, air humidity or the like.

Figure 3:
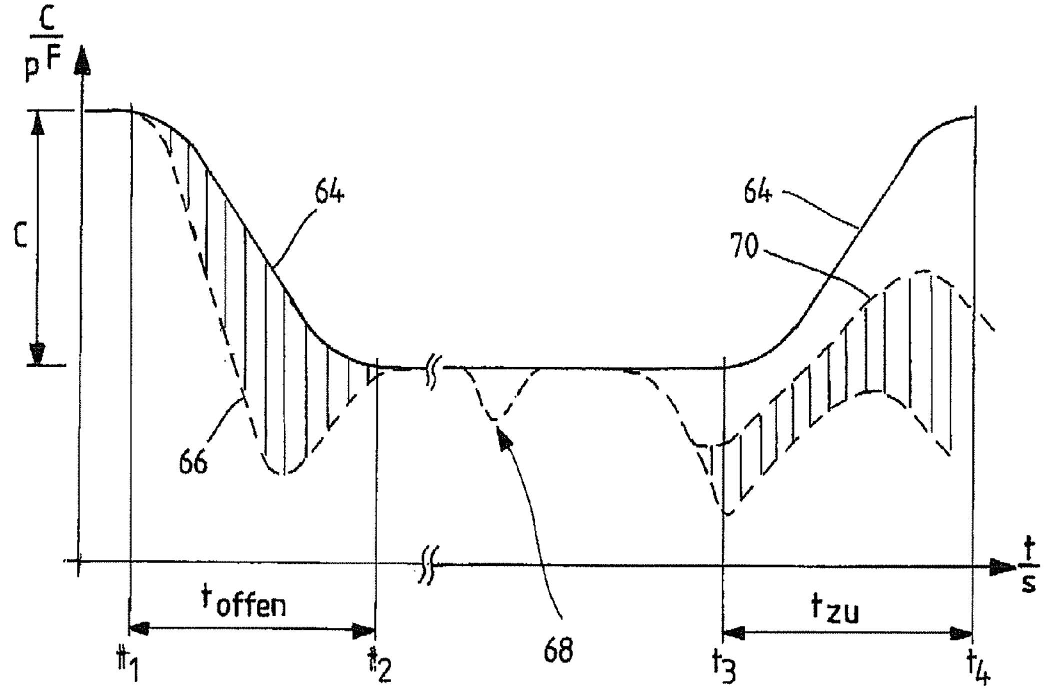
FIG. 3 is a diagram illustrating changes of capacitance during the movement of the barrier elements over time (grounded body).

FIG. 3 shows a diagram for the time line of a change of capacitance as it occurs for example during the intended operation of gate 10. The time is used as the abscissa and the capacitance is used as the ordinate. A solid curve 64 represents the measured capacitance during an opening and a subsequent closing operation of the door wings 12, 14. As can be seen from FIG. 3, in the time range between $t_1$ and $t_2$, the door wings 12, 14 are moved to the open position. This results in a decrease of the capacitance, which can be detected by means of the evaluation circuit 36. In the time range between $t_2$ and $t_3$, the gate 10 is in the position for passage, in which the door wings 12, 14 are maintained in the open position. In the time range $t_3$ to $t_4$, the door wings 12, 14 are returned to the closed position. This results in an increase of the capacitance of the sensors 22, 24, which can be detected by means of the evaluation circuit 36. It can be clearly seen that the current position of the door wings 12, 14 can be determined from the change of the capacitance.

A broken curve 66 in FIG. 3 represents the opening and closing of the door wings 12, 14 as previously described by way of the solid curve, wherein in the present case an individual enters the space 34. It can be clearly seen that in the time range of $t_1$ to $t_2$, the capacitance clearly decreases more strongly and faster during the opening operation of the door wing 12, 14 than this would be the case without the influence of the individual. In the open position in the time range $t_2$ to $t_3$, the capacitance first is the same as that represented by the solid curve 64. Only when the individual passes the door wings 12, 14, a change of the capacitance can again be recognized (reference number 68), which resumes the value represented by the solid curve 66 after the individual has passed and with the door wings 12, 14 in the open position. In the range $t_3$ to $t_4$, the door wings are moved to the closed position, the influence of an individual being recognizable in addition by a decrease of the capacitance. Only after the individual has left the space 34, the capacitance resumes the value as that which is represented by the solid curve.

The illustrated measurement curve shows the behavior of a measurement setup which reacts to negative changes of the capacitance. (Grounded electrically conducting body, ground-related measuring voltage) For the time range $t_3$ to $t_4$, the limit of recognizability is plotted by way of the upper broken curve 70. The system reacts to negative changes of the capacitance. But during the time range of $t_3$ to $t_4$, the capacitance increases continuously. If a body enters the measuring area during the time range of $t_3$ to $t_4$, the value of the increase of the capacitance caused by the closing operation of the door wing must be exceeded by a higher negative value of a body present in the swiveling area, in order that the measuring circuit recognizes a body as such. The measuring sensibility is dulled by this effect in the time range of $t_3$ to $t_4$. Changes of the capacitance in the region between the solid curve 64 and the broken curve 70 are not recognized by the system.

The embodiment illustrated in the figures merely serves to explain the present invention and is not in any way limiting to the invention. Of course, the invention can not only be used in entrance barriers, but of course also in other access or access controlling systems, for example in sports facilities, security areas in enterprises, but also in agriculture, for the sorting of cattle or the like. It should be noted that a stationary electric field can also be a stationary alternating electric field with a predetermined frequency and amplitude.

What is claimed is:

1. An entrance barrier comprising:

a first barrier element and a second barrier element each movable between an open position and a closed position;

driving means for moving the first barrier element and the second barrier element between the open position and the closed position;

a control unit for controlling the driving means; and a sensor unit connected to the control unit;

a first capacitive sensor included in the sensor unit;

a second capacitive sensor included in the sensor unit;

a first half of each of the first capacitive sensor and the second capacitive sensor is included with the first barrier element; and a second half of each of the first capacitive sensor and the second capacitive sensor is included with the second barrier element;

wherein capacitance is measured between the first half and the second half of each of the first capacitive sensor and the second capacitive sensor.

2. The entrance barrier according to claim 1, wherein the sensor is arranged on the barrier element.

3. The entrance barrier according to claim 1, wherein the sensor is formed at least partly by an electrically conducting part.

4. The entrance barrier according to claim 1, wherein the sensor includes an open conductor loop and/or a conductor surface.

5. The entrance barrier according to claim 1, wherein the first barrier element and the second barrier element are jointly movable.

6. The entrance barrier element of claim 1, wherein the first barrier element includes only the first half of each of the first capacitive sensor and the second capacitive sensor.

7. The entrance barrier according to claim 1, wherein the first half of each of the first capacitive sensor and the second capacitive sensor is formed as one piece with the first barrier element and the second half of each of the first capacitive sensor and the second capacitive sensor is formed as one piece with the second barrier element.

8. A method for operating an entrance barrier comprising:

moving a first barrier element and a second barrier element with driving means between an open position and a closed position;

controlling the driving means with a control unit;

detecting the presence of a dielectrically permeable and/or electrically conducting body in a space in the range of the first barrier element and the second barrier element with a first capacitive sensor and a second capacitive sensor, a first half of each of the first capacitive sensor and the second capacitive sensor is on the first barrier element, and a second half of each of the first capacitive sensor and the second capacitive sensor is on the second barrier element;

measuring capacitance between the first half and the second half of each of the first capacitive sensor and the second capacitive sensor; and transmitting information from each of the first and the second capacitive sensors to the control unit.

9. The method according to claim 8, further comprising deactivating the driving means with the control unit.

10. The method according to claim 8, further comprising verifying whether a user is authorized to pass through the entrance barrier.

11. The method according to claim 8, further comprising tracing and/or recording passage of the dielectrically permeable body.

12. The method according to claim 8, further comprising monitoring a position of the barrier element with the sensor.

13. The method according to claim 8, further comprising evaluating the first capacitive sensor and the second capacitive sensor in a time-multiplex mode.

14. The method according to claim 8, further comprising automatically calibrating the sensor.

15. An entrance barrier comprising:

a first barrier and a second barrier opposite thereto, the first barrier and the second barrier are both movable to an open position to permit passage beyond the first and the second barriers, and movable to a closed position to restrict passage beyond the first and the second barriers; and a sensor unit configured to detect the presence of a person proximate to the first barrier and the second barrier, the sensor unit including:

a first capacitive sensor including a first conductor mounted to the first barrier and a second conductor mounted to the second barrier; and a second capacitive sensor including a third conductor mounted to the first barrier and a fourth conductor mounted to the second barrier;

wherein capacitance of the first capacitive sensor is measured between the first conductor and the second conductor, and capacitance of the second capacitive sensor is measured between the third conductor and the fourth conductor; and wherein the first capacitive sensor and the second capacitive sensor change capacitance in response to presence of a person proximate thereto.

16. The entrance barrier of claim 15, further comprising a motor for moving the first barrier and the second barrier between the open position and the closed position.

17. The entrance barrier of claim 15, further comprising a control unit configured to control movement of the first barrier and the second barrier.

18. The entrance barrier of claim 15, wherein the first conductor is a first half of a first open conductor loop of the first capacitive sensor, the second conductor is a second half of the first open conductor loop, the third conductor is a first half of a second open conductor loop of the second capacitive sensor, and the fourth conductor is a second half of the second open conductor loop.

19. The entrance barrier of claim 15, wherein sensitivity of the sensor unit is adjusted based on ambient conditions.

20. The entrance barrier of claim 15, further comprising an evaluation circuit configured to evaluate the first capacitive sensor and the second capacitive sensor in a time-multiplex mode.

* * * * *